United States Patent [19]
Easton

[11] 3,789,409
[45] Jan. 29, 1974

[54] NAVIGATION SYSTEM USING SATELLITES AND PASSIVE RANGING TECHNIQUES

[76] Inventor: Roger L. Easton, 7704 Oxon Hill Rd., Oxon Hill, Md. 20021

[22] Filed: Oct. 8, 1970

[21] Appl. No.: 79,307

[52] U.S. Cl. .... 343/112 R, 343/100 ST, 343/112 D
[51] Int. Cl. .......................... G01s 5/14, G01s 11/00
[58] Field of Search ....... 343/112 D, 112 R, 100 ST

[56] References Cited
UNITED STATES PATENTS

| | | | |
|---|---|---|---|
| 3,643,259 | 2/1972 | Entner | 343/112 D X |
| 3,384,891 | 5/1968 | Anderson | 343/100 ST UX |
| 2,947,985 | 8/1960 | Cooley | 343/112 D UX |
| 3,397,400 | 8/1968 | Maass et al. | 343/112 D UX |
| 2,924,820 | 2/1960 | Dishal et al. | 343/112 D UX |
| 3,339,202 | 8/1967 | Earp | 343/112 D X |

Primary Examiner—Richard A. Farley
Assistant Examiner—Richard E. Berger
Attorney, Agent, or Firm—R. S. Sciascia; Arthur L. Branning; J. G. Murray

[57] ABSTRACT

A navigation system wherein the navigator's location is obtained by determining the navigator's distance (or range) from one or more satellites of known location. Each satellite transmits multifrequency signals that are derived from a stable oscillator which is phase synchronized with the navigator's equipment that produces similar multifrequency signals. Phase comparison between the signals received from the satellites and the locally produced signals indicates both the distance between the navigator and the satellites and the navigator's location. In determining his location, the presence of the navigator is not revealed since no interrogatory transmission by him is required.

6 Claims, 3 Drawing Figures

NAVIGATION SYSTEM USING SATELLITES AND PASSIVE RANGING TECHNIQUES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Until recently, celestial navigation techniques have provided mankind with the best available accuracy for terrestrial navigation. A new order of accuracy has become possible with the introduction of artificial earth-satellite navigation systems wherein the instantaneous location of the satellites is precisely known.

Prior earth-satellite navigation systems have, in general, either included the measurement of range rate (doppler frequency shift) of cw transmissions by the satellite or measured range by measuring the time interval between interrogation and response by a transponder on the satellite. It has been found that range is the better parameter to use. Unfortunately, the measurement of range has hitherto required the navigator to radiate an interrogation signal (and thereby betray his presence) and also raises the possibility that the satellite transponder will saturate from a plurality of simultaneous interrogations by different navigators.

SUMMARY OF THE INVENTION

The present invention provides the advantages of the prior earth-satellite navigation systems while avoiding their disadvantages. More specifically, the present invention allows the navigator to passively determine his position by measuring the distance, or range, to one or more satellites. Each satellite transmits multifrequency signals which are derived from extremely precise oscillators. Similar multifrequency signals are derived by the navigator's equipment from an extremely precise oscillator which is phase synchronized with the oscillators on the satellites. By measuring the phase differences between the signals received from the satellites and the locally produced reference signals, the navigator obtains an indication of the distance to the satellites and, therefrom, of his own location. The navigator's presence is not betrayed since no interrogation signal transmission is required.

OBJECTS OF THE INVENTION

It is, therefore, an object of the invention to provide an improved earth-satellite navigation system.

A further object is to provide an imporved earth-satellite navigation system wherein range is measured without the necessity of transmitting an interrogatory signal.

Yet another object is the provision of an improved earth-satellite navigation system wherein range is measured without the necessity of transmitting an interrogatory signal by comparison of the phase of signals received from the satellites and locally generated reference signals.

A still further object of the invention is to provide an improved earth-satellite navigation system and technique wherein both the satellite's and the navigator's equipment include precisely stable oscillators which are phase locked and wherein range is measured without the necessity of transmitting an interrogatory signal by comparison of the phase of signals received from the satellites and locally generated signals.

DESCRIPTION OF THE DRAWINGS

Other objects and advantages of the invention will hereinafter become more fully apparent from the following description and the annexed drawings, which illustrate a preferred embodiment of the invention, and wherein.

DESCRIPTION OF THE PREFERRED EMBODIMENT

Figure 1:
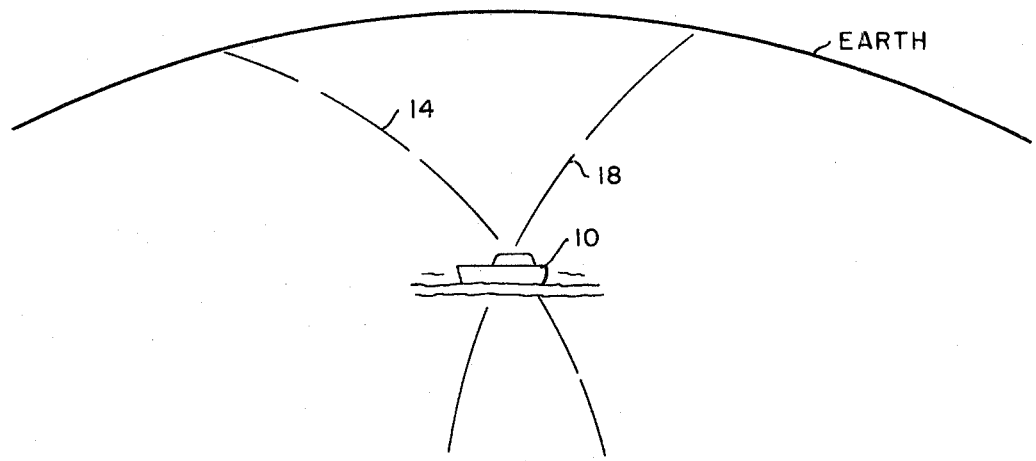
FIG. 1 is a perspective view of the invention.

Before proceeding with a description of the drawings wherein like reference characters designate like or corresponding parts throughout the several Figs., the reader is cautioned that the drawings, and in particular FIG. 1, should not be construed as being more than merely representative of a practical system. Obviously, much of the drawings and many of the features of the disclosed embodiment are dimensionally distorted and extremely simplified for the purpose that the disclosure of the invention might be presented in a manner having clarity of illustration and description.

Referring now to FIG. 1, the navigator of concern, who is using the techniques and equipment of the invention, is located on the ship 10. The navigator, knowing the precise coordinates of a first satellite 12 (from tables prepared by procedures which are not, per se, a part of this invention) determines the range of the satellite by means and methods yet to be described and, from this knowledge of satellite position and range, is able to determine a first line of position (LOP) 14 for the ship 10. The same procedures are followed with respect to a second satellite 16 to determine the second LOP 18. The intersection of the LOPs 14 and 18, of course, define the location of the ship 10 with an accuracy of an order of magnitude greater than is obtainable by conventional navigation practices.

It is apparent that comparably good results (but not instantaneous navigational "fixes") can be obtained by using only one swiftly orbiting satellite and determining two LOPs at different times.

Figure 2:
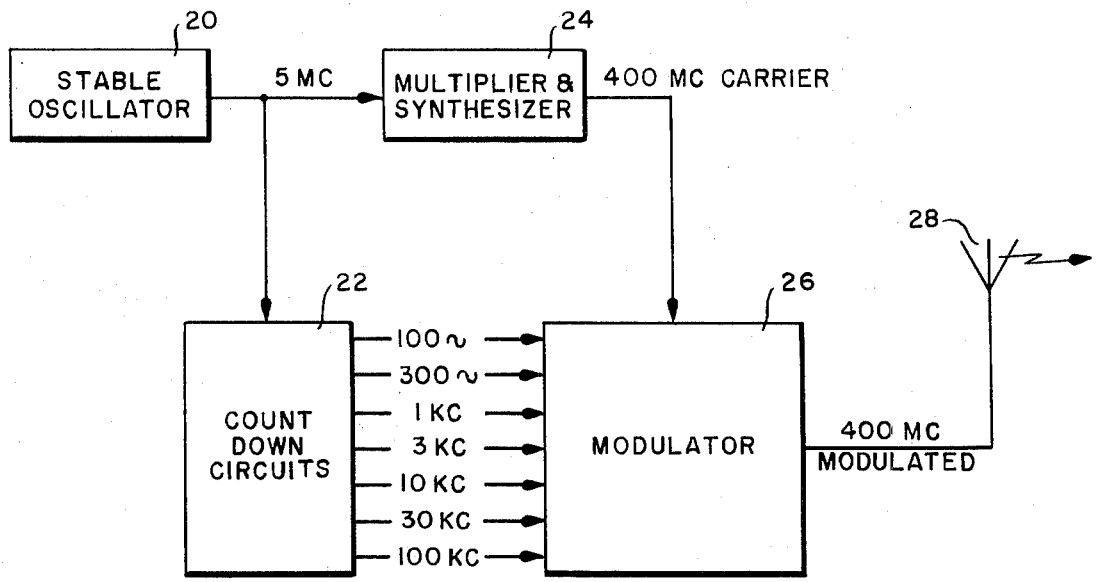
FIG. 2 is a block diagram of the equipment on the satellite portion of the invention.

The transmitting equipment on the satellites 12 and 16 is substantially identical and is illustrated in block diagram form in FIG. 2. For purposes of signal identfication, the satellites 12 and 16 may transmit on different carrier frequencies. Further, as the reader no doubt realizes, the use of specific frequencies in the following description is merely for the purposes of description and, while the mentioned frequencies may be typical, should not be considered as in any way limiting the invention. Obviously, the invention could incorporate many carrier and modulating frequencies different from those set forth in the following description.

In FIG. 2 the stable oscillator 20 is controlled by an atomic clock (or is a crystal oscillator which has an equivalent frequency stability) and typically produces a precise 5 MC signal. Preferably, means are included (but not shown) which allow phase adjustments in this 5 MC signal to correct for any phase drift that does occur.

The 5 MC output signal of oscillator 20 is connected to count down circuits 22 which typically produce 100 cps, 300 cps, 1 KC, 3 KC, 10 KC, 30 KC and 100 KC signals. The output of oscillator 20 is also connected to multiplier and synthesizer circuits 24 which produces the 400 MC carrier signal that is modulated by the seven output signals of count down circuits 22 in the modulator 26 and then transmitted by the satellite antenna 28. It is worthy of emphasis that all of the modulating signals are derived from the common source, i.e., oscillator 20.

Figure 3:
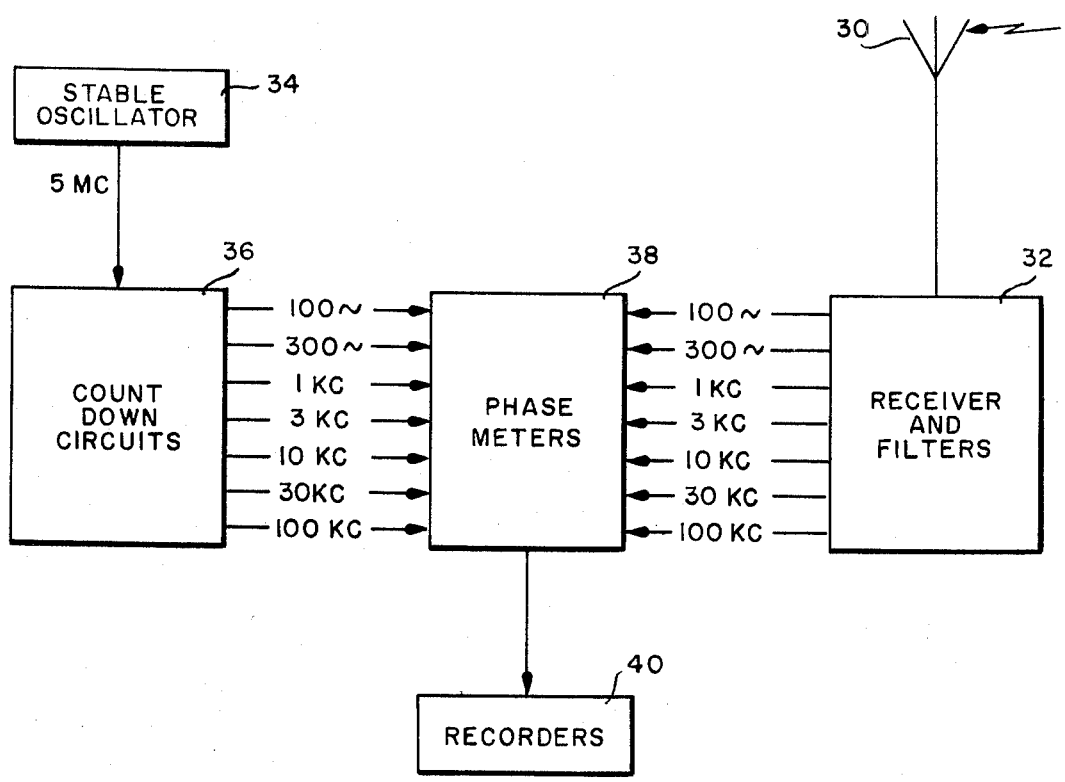
FIG. 3 is a block diagram of the equipment located at the navigator's station.

Referring now to FIG. 3 which is a block diagram of the equipment at the navigator's station on the ship 10. The multifrequency modulated carrier signal from one of the satellites 12 or 16 is intercepted by antenna 30 and, by techniques which are extremely well known, converted by receiver and filter system 32 into 100 cps, 300 cps, 1 KC, 3 KC, 10 KC, 30 KC and 100 KC signals. Care must of course be taken, according to the best known design practices, to avoid the introduction of even small phase shifts into any of the seven output signals of the receiver and filter system 32.

Stable oscillator 34 is similar in frequency stability to the oscillator 20 (FIG. 2) and typically produces a 5 MC signal which is kept synchronized or in phase coincidence with the signal produced by oscillator 20. The reader will appreciate that oscillator 34, being on ship 10 where weight is relatively not critical, would typically be controlled by an atomic clock whereas oscillator 20, being on a satellite where weight is extremely critical, might be an ultra stable crystal oscillator. Oscillator 34 is connected to count down circuits 36 which typically produce 100 cps, 300 cps, 1 KC, 3 KC, 10 KC, 30 KC and 100 KC output signals. The count down circuits 36 are functionally similar to the count down circuits 22 (FIG. 2) but may be very different in size and weight because the circuits on the satellite will, for obvious reasons, be designed to be small and light.

Phase meters 38 are connected to receive the seven output signals from receiver and filtering system 32 and the seven reference signals from count down circuits 36 and function to energize recorders 40 to provide a record of the phase difference between (say) the 3 KC signals from both system 32 and circuits 36, etc. The seven individual phase comparisons at differing frequencies provided by recorders 40 enable the navigator to determine the range of the satellite without ambiguity and with good resolution. In other words, the phase comparison of the low frequencies are not ambiguous but do not provide high accuracy while the phase measurement of the high frequency signals, which are ambiguous because the record will not distinguish phase differences of 20°, 380°, 740°, etc., will provide measurements of high accuracy.

The operation of the disclosed preferred embodiment of the invention is by now apparent. Highly stable oscillators 20 and 34 (which are respectively on the satellites 12 and 16 and on the navigator's ship 10) produce 5 MC signals which are practically phase locked and which are changed by count down circuits 22 and 36 (which are respectively on the satellites 12 and 16 and on the navigator's ship 10) to 100 cps, 300 cps, 1 KC, 3 KC, 10 KC, 30 KC and 100 KC signals which are also, frequency by frequency, practically phase locked. The seven count down circuits output signals on each of the satellites 12 and 16 modulate a carrier frequency signal which can be (but is not necessarily) synthesized from the 5 MC oscillator signal. Each of the modulated carrier signals is broadcast and is selectively received (the carrier frequency on each satellite being different) by the equipment at the navigator's station on ship 10.

After demodulation by the receiver and filter system 32, the seven component signals are compared, frequency by frequency, with the seven reference signals produced by count down circuits 36, the phase differences of which are indications of the transit time of the signals transmitted by the satellites and hence a measure of the range of the satellites. Since the navigator knows (from prepared tables) the exact location of the satellites 12 and 16, it is possible to determine from the ranges of the satellites the LOPs 14 and 18 and to determine the position of the navigator's ship 10 from the intersection of the LOPs 14 and 18.

There has been disclosed an improved earth satellite navigation system wherein both the satellite's and navigator's equipment include precisely stable oscillators which are phase locked and wherein range is passively measured, without the necessity of transmitting an interrogatory signal, by comparison of the phase of signals received from the satellites and locally generated signals. Obviously many modifications and variations of the present invention are possible in the light of the above teachings. For example, the navigator's station could obviously be on a flying airplane rather than on surface ship 10 as described. It is therefore to be understood, that within the scope of the appended claims, the invention may be practiced otherwise than as specifically described.

What is claimed and desired to be secured by letters patent of the United States is:

1. A navigation system comprising:
   at least two earth satellites, the instantaneous locations of which are precisely known, each satellite including transmitting means for broadcasting multifrequency signals derived from a first extremely stable oscillator, and
   a navigator's station including:
   receiving means for receiving said broadcast multifrequency signals;
   signal generating means including a second extremely stable oscillator for producing multifrequency signals the same as said broadcast signals, and
   phase comparison means connected to said receiving means and to said signal generating means for comparing the phase of said received multifrequency signals to the phase of said produced multifrequency signals
   whereby the location of said navigator's station can be determined from the intersection of lines of position established by detecting the station's distance from the instantaneously known location of the satellites derived from said phase comparisons without the necessity of betraying the presence of said navigator's station by an interrogation signal.

2. The technique of determining a navigator's location by determining his position relative to a moving satellite whose location is known at all times comprising the steps of:
   measuring the phase difference between multifrequency signals received from said satellite at first and second locations and reference signals of corresponding frequencies produced at said navigator's location, said signals including a low frequency signal and a signal having a frequency at least one hundred times higher than the low frequency signal;

determining approximate first and second distances between said navigator and said satellite at the first and second locations, respectively, from the phase comparison of said low frequency signals;

determining accurate first and second distances from said approximate distances and the phase comparison of the higher frequency signals;

establishing first and second lines of position of said navigator from said accurately determined distances, whereby said navigator's location is determined by the intersection of said first and second lines of position.

3. The navigation system of claim 1 wherein no more than one satellite broadcasts at any one carrier frequency.

4. The navigation system of claim 3 wherein said receiving means functions to separate said multifrequency signals from the carrier frequency which is broadcast.

5. The navigation system of claim 4 wherein said signal generating means includes count down circuits which are connected to said second stable oscillator.

6. The navigation system of claim 5 wherein said transmitting means includes multiplier and synthesizer means which are connected to said first stable oscillator and which produce said carrier frequency signal.

* * * * *